United States Patent Office 3,321,758
Patented May 23, 1967

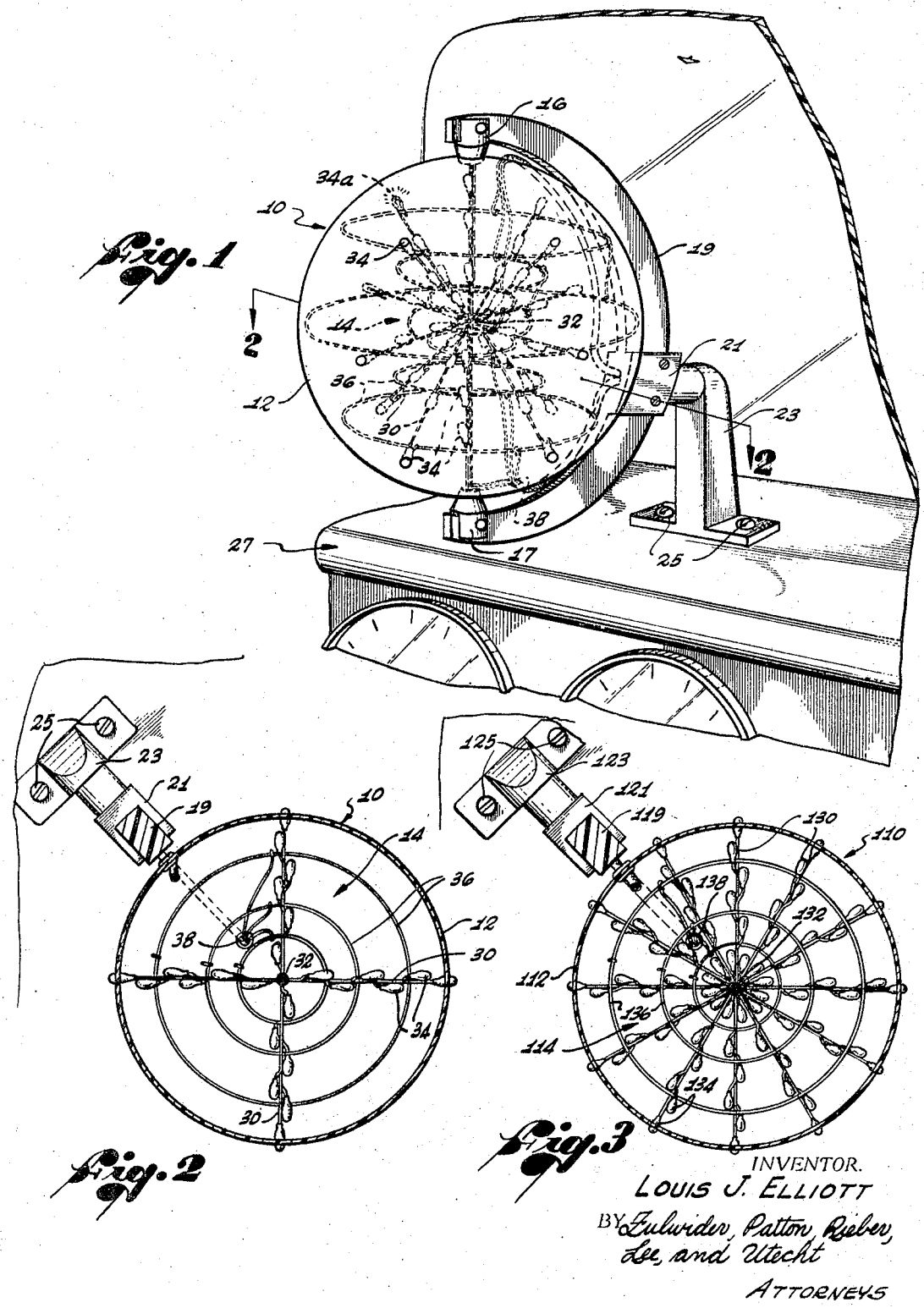

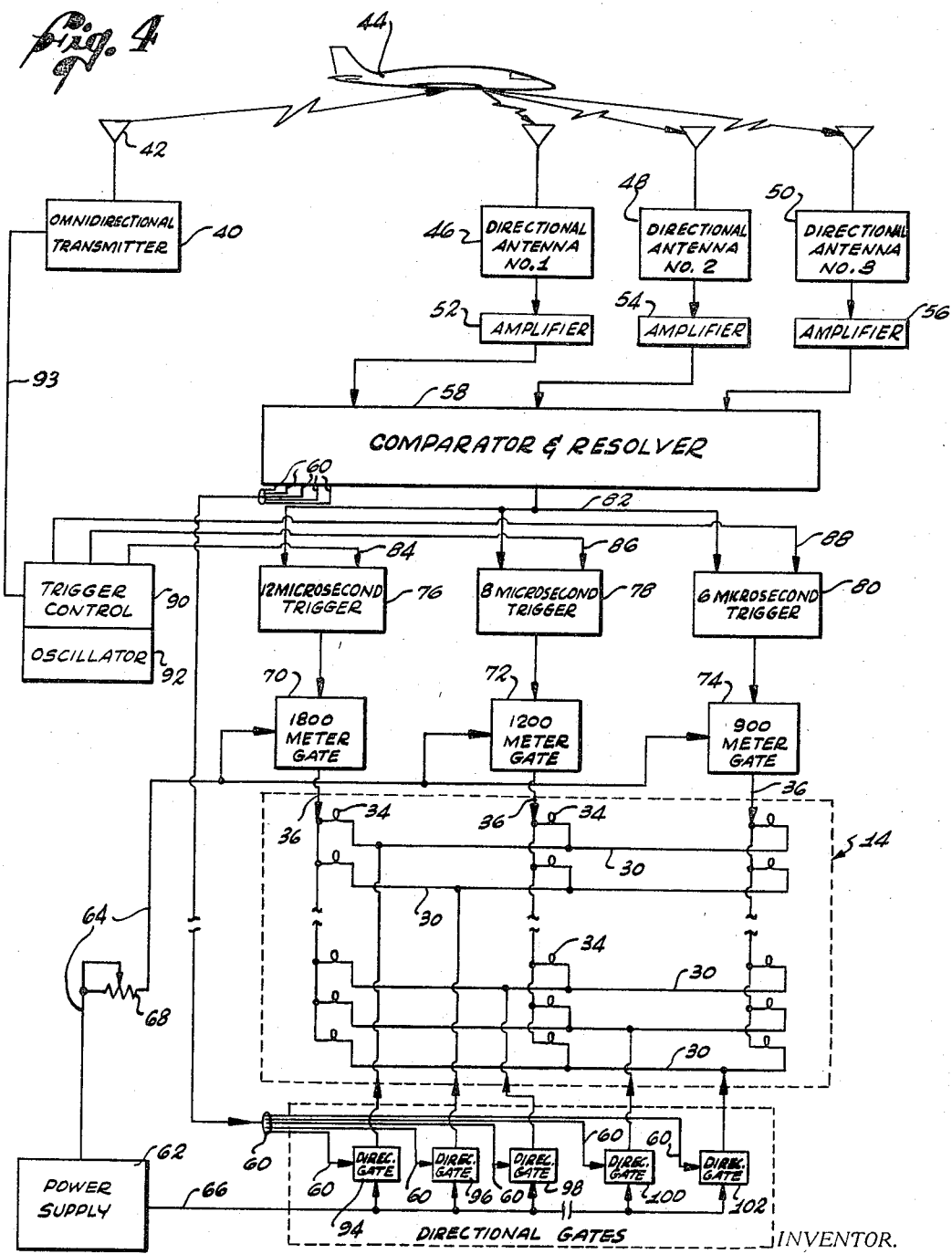

3,321,758
PROXIMITY DISPLAY SYSTEM
Louis J. Elliott, Encinitas, Calif., assignor to Autosearch Corporation, Encinitas, Calif., a corporation of Nevada
Filed July 6, 1964, Ser. No. 380,417
10 Claims. (Cl. 343—7.9)

This invention relates generally to proximity warning systems, and more particularly to a new and improved system for detecting and continuously displaying in three dimensions the relative positions of all objects within a predetermined distance of a central operating station where the improved system is located.

It has been a common practice to provide aircraft with relatively complex equipment for pinpointing the locations of objects in the sky, to compute whether or not the tracks of the detected objects present a hazard, i.e., whether or not the objects are on collision courses with the aircraft in which the detection equipment is mounted, and to initiate corrective action whenever necessary. Unfortunately, such complex detection and collision avoidance control equipment is usually heavy, bulky and expensive. Hence, those concerned with the development of proximity warning and collision avoidance systems have long recognized the need for apparatus of this type which is relatively simple, compact, reliable, lightweight and inexpensive. The present invention fulfills all of these needs.

Accordingly, it is an object of the present invention to provide a new and improved proximity warning system which overcomes the above and other disadvantages of the prior art.

Another object is to provide a new and improved proximity display system which is simpler and less bulky than previous systems.

A further object of this invention is the provision of a new and improved proximity display system which is relatively inexpensive, lightweight and reliable, yet is less complex than previous systems.

Still another object is to provide a novel polar coordinate proximity display system in three dimensions.

Yet another object of the present invention is the provision of a relatively simple polar coordinate proximity display device which indicates the distance and direction relative to the central location of the display device of all objects within a predetermined radius.

A still further object is to provide a new and improved three dimensional proximity display system for visually presenting the location and progress of surrounding objects in a simplified manner which obviates the need for computing apparatus to evaluate possible collision courses and control collision avoidance maneuvering.

Another object of this invention is the provision of a compact, three dimensional proximity display device wherein the locations of surrounding objects are represented by illuminated positions in a selectively energized radial matrix within the display device.

The above and other objects and advantages of this invention will become apparent from the following description, when taken in conjunction with the accompanying drawings of illustrative embodiments thereof, and wherein:

FIGURE 1 is a perspective view of a three dimensional, polar coordinate proximity display device, in accordance with the present invention, mounted in the cockpit of an aircraft;

FIGURE 2 is a sectional view of the display device, taken along the line 2—2 in FIGURE 1;

FIGURE 3 is a sectional view similar to FIGURE 2, and illustrates the manner in which the display matrix may be expanded to include any number of directions and distances for pinpointing the locations of objects relative to the craft in which the display device is mounted; and FIGURE 4 is a combined block diagram and electrical schematic of a complete proximity display system in accordance with the present invention.

Referring now to the drawings, and particularly to FIGURES 1 and 2 thereof, a proximity display device in accordance with the present invention is denoted generally by the reference numeral 10. The display device 10 includes an outer transparent housing which is preferably in the shape of a sphere 12, which may be fabricated of any appropriate structural material, such as plastic, glass and the like.

A radial matrix 14 for providing an illuminated polar coordinate display in three dimensions is supported within the sphere 12, the center of the radial matrix being coincident with the center of the sphere. The sphere 12 is relatively compact, typically ranging from three to six inches in diameter, and, by virtue of its transparency, enables direct observation of the illuminated polar coordinate display within the sphere by the pilot of the aircraft in which the overall proximity warning system is incorporated.

The sphere 12 is journalled for rotation about a vertical axis by means of a pair of upper and lower bearings 16, 17, respectively. The frictional drag between the bearings 16, 17 and the sphere 12 is relatively high to prevent unintentional rotation of the sphere, and the sphere is usually rotated only under unusual circumstances, as during initial alignment or subsequent realignment of the matrix within the sphere relative to the roll axis of the aircraft in which the display device is located. During such alignment procedures, the sphere 12 is usually rotated only through a very small angular displacement.

The sphere supporting bearings 16, 17 are carried at the ends of a semi-circular arm 19 which is, in turn, affixed at 21 to a mounting bracket 23. The mounting bracket 23 may be secured by any appropriate fastening means, such as the screws 25, to any conveniently available mounting surface in the cockpit of the aircraft. Preferably, the display device 10 is mounted, via the bracket 23, in the vicinity of the aircraft instrument panel 27 so that the display can be readily observed by the pilot at all times during normal flight operations.

The radial matrix 14 within the sphere 12 includes a plurality of independent electrical conductors electrically insulated from each other and physically arranged so that they all extend outwardly and in different directions from the common center of the matrix and the sphere. Each of these electrically conductive radii defines a "direction line" 30 with respect to the common center 32 of all of the direction lines, the center representing the location of the aircraft in which the display system is mounted and with respect to which all other objects are located. Hence, each direction line 30 represents the same direction with respect to the aircraft as it does with respect to the center of the matrix 14.

A plurality of electric lamps 34, such as neon bulbs and the like, are located along each direction line 30 at uniformly spaced intervals. The distance of each lamp 34 from the center 32 along a direction line 30 represents a corresponding proportional distance away from the aircraft for an object in the sky or on the ground. For example, if the sphere 12 is six inches in diameter, and the overall detection and display system covers a three mile radius about the aircraft, then the outermost lamps 34 would represent distances of three miles from the aircraft while other lamps would represent lesser, proportional object distances from the aircraft.

One electrical terminal of each of the lamps 34 is electrically connected to the conductive direction line along which the bulb is located. The other electrical terminal of each lamp 34 is electrically connected to an electrically conductive "distance line" 36 which is common to each and every lamp located at the same radial distance from the center 32 of the matrix 14. Each group of lamps 34 representative of a common distance from the center of the matrix 14, regardless of the direction line 30 along which any particular lamp may be located, likewise is electrically connected to a common distance line conductor 36. In other words, every lamp indicative of an object position three miles from the aircraft is electrically connected to a common three mile distance line. Similarly, every lamp indicative of an object distance two miles from the aircraft in which the display device 10 is mounted is electrically connected to a common two mile distance line, etc.

In a like manner, all of the lamps 34 in the same direction or line of sight from the aircraft in which the display unit 10 is mounted are, as previously indicated, electrically connected to a common direction line 30. Hence, the physical position of each lamp 34 in the matrix 14 is uniquely defined by its three dimensional polar coordinates in terms of a bearing vector (direction) from the aircraft and distance away from the aircraft along the bearing vector.

Electrically, each lamp 34 is uniquely defined by its direction line and distance line coordinates. Any pair of electrically energized individual direction lines and distance lines will uniquely identify and illuminate one and only one of the lamps 34. Hence, if a signal is received from an object in the sky, and the signal is resolved into direction and distance components which are routed to the appropriate direction and distance lines 30, 36, respectively, a lamp 34 will be energized which will, in its illuminated state, locate the relative position of the object with respect to the aircraft, e.g., note the illuminated lamp 34a at the upper left side of the display device 10 in FIGURE 1.

The direction lines 30 and distance lines 36 are energized at different levels of electrical potential so that, in uniquely defining an object position at their coordinate crossover point, they provide a sufficient potential difference or voltage to illuminate the lamp 34. In this connection, individual electrical energization lines for each common direction line 30 and each common distance line 36 are directed through appropriate conduit passages in the mounting bracket 23, and are routed through appropriate openings, such as the opening 38, in the sphere 12 for connection therein to the proper direction and distance lines of the display device 10.

The invention is not to be considered as limited to the use of lamps 34, as illustrated in FIGURES 1 and 2 of the darwings, but rather is deemed to include any means for selectively illuminating a unique direction line-distance line coordinate position in response to electrical energization of the appropriate lines. By way of example, the sphere 12 may be gas-tight and filled with neon, argon or other gas that will glow under the application of an appropriate voltage across spaced apart electrodes. In this connection, the electrically conductive direction lines 30 and distance lines 36 can be spaced apart at each crossover zone by means of any appropriate standoff insulator device.

As will be apparent from FIGURE 3 of the drawings, the proximity display device may be expanded to include any number of direction lines and any number of distance lines to increase the precision of object location by increasing the number of positions capable of indication by the display device. FIGURE 3 illustrates a display device 110 which has been expanded in this manner. In this regard, the reference numerals 110–138 of the display device shown in FIGURE 3 designate like elements as those designated by the reference numbers 10– 38, respectively, for the display device illustrated in FIGURES 1 and 2.

Referring now to FIGURE 4 of the drawings, the overall proximity detection and display system is shown. The radial matrix 14 is shown enclosed within dotted lines and includes a plurality of direction lines 30, distance lines 36, and lamps 34 connected between individual direction and distance lines making up the matrix.

A transmitter 40 and omnidirectional antenna 42 propagate pulsed electromagnetic radiation into space in a 360° solid angle. The pulse signal from the antenna 42 is reflected from an object 44. Although the object 44 is illustrated as being another aircraft, this is by way of example only, and the objects detected may be the ground, mountains, etc.

The pulse signal reflected from the object 44 is received by an array of directional antennas 46, 48, 50, well known in the art, which are oriented in three mutually perpendicular directions so that reflected signal direction can be determined by a combination of antenna reception pattern and received signal strength. The signal received at each of the antennas 46, 48, 50 are individually amplified by amplifiers 52, 54, 56, respectively, and the amplified outputs are directed as inputs to a conventional comparator and resolver 58.

The comparator and resolver 58 operates in the manner of a goniometer to combine the antenna input signals into a single output signal pulse along a specific line representing the bearing or direction of the object 44 and the signal reflected therefrom. In this connection, the comparator and resolver 58 has an individual output line 60 corresponding to each of the direction lines 30 in the display matrix 14.

A power supply 62 has two output lines 64, 66, at different electrical potentials. A variable resistance 68 is connected in series with the power supply output line 64, and adjustment of the magnitude of this resistance provides control over the intensity of light produced by the object position indicating lamps 34 in the matrix 14. In this connection, it might be desirable for the lamps 34 to be brighter in the daylight hours than in the evening hours so that the lamps can be readily observed at all times.

The power supply output line 64 is a common bus providing input to each of a plurality of range or distance gates 70, 72, 74. Typically, the distance gates 70, 72, 74 each comprise a silicon control rectifier for selectively gating the input potential of the power supply line 64 to one and only one of the direction lines 36 of the matrix 14.

The trigger electrode (not shown) of each of the control rectifiers in the gates 70, 72, 74 is under the control of an appropriate timing trigger circuit 76, 78, 80, respectively. Each of these timing trigger circuits 76, 78, 80 receives a pair of inputs, one of these inputs being a common output signal from the comparator and resolver 58 over line 82, and the other signal being a timing control signal over one of the lines 84, 86, 88, respectively, from a trigger control network 90 of conventional design. The signal produced on line 82 from the comparator and resolver 58 does not represent any particular target bearing and is indicative only of the time of arrival of the reflected pulse since the pulse was transmitted from the omnidirectional antenna 42. In this connection, the signal provided on line 82 may be obtained directly from one of the antennas 46, 48 or 50, assuming sufficient signal strength is available without first passing through the comparator and resolver 58.

The trigger control 90 is operated by a time base oscillator 92 which is synched via line 93 to start running with each pulse produced by the transmitter 40. The trigger control 90 gates the timing triggers 76, 78, 80 so that each of these triggers remains open only for prescribed time intervals, and only one trigger is gated open at any one time. Hence, the six microsecond trigger 80 is open to pass the signal on line 82 during the time interval from zero to six microseconds after propagation of each pulse from the antenna 42. The eight microsecond trigger 78 is open to pass a signal on line 82 during the six to eight microsecond interval after transmission of each pulse, and the twelve microsecond trigger 76 is open only during the eight to twelve microsecond time interval. The timing triggers 76, 78, 80 are compensated for the time delay introduced by the signal receiving and handling circuits.

Let us assume that a signal is reflected from the object 44 and is received by the antennas 46, 48, 50 seven microseconds after the pulse is propagated by the antenna 42. A pulse, corresponding to the received signal, is produced on the line 82 and is passed by the eight microsecond trigger 78 to the trigger electrode of the control rectifier in the 1200 meter gate 72. This will enable the 1200 meter gate and connect the electrical potential of the power supply line 64 to the distance line 36 representative of an object range of 1200 meters from the aircraft in which the proximity display system is located. The particular distance gate 70, 72, 74 enabled, and corresponding distance line 36 energized within the matrix 14, varies with the time of arrival of the reflected signal from the object 44 and, hence, with the particular timing trigger 76, 78, 80, respectively, gated open at the time of arrival of the reflected signal.

The direction lines 30 in the matrix 14 are selectively energized in a similar manner. As previously indicated, the comparator and resolver 58 energizes only one of a plurality of output lines 60 most nearly indicative of the bearing of the object 44 relative to the aircraft embodying the display system. Each output line 60 of the comparator and resolver is directed to the trigger electrode of a silicon control rectifier or the like in each of a plurality of direction gates such as the gates 94, 96, 98, 100, 102. Although only five directional gates are shown, this is solely by way of example, and the system may be readily expanded to include any number of directional gates, one for each of the direction lines 30 of the matrix 14. Similarly, any number of distance gates may be employed, one for each of the distance lines 36 of the matrix 14.

The power supply line 66 is a bus providing a common input potential to the directional gates 94, 96, 98, 100, 102. However, only one of the directional gates in energized by a line 60 at any one time corresponding to receipt of a single pulse and, hence, only one of the direction lines 30 will be energized by connection to the power supply line 66 through a directional gate. In this manner, each pulse received by the antennas 46, 48, 50 results in energization of a single direction line 30 and a single distance line 36 which together uniquely define the coordinates of a single lamp 34 within the display matrix 14. The latter lamp is energized by the potential difference between the power supply lines 64, 66 and is thus illuminated to indicate the relative position of the object 44 from which the received pulse was reflected.

The aforedescribed description of operation of the proximity display system has been limited to the receipt of single pulses from individual reflecting objects. However, it is to be understood that the recepit of a plurality of reflected pulses from a plurality of different objects will cause substantially simultaneous energization of a plurality of direction lines 30 and distance lines 36, so that several of the lamps 34 in the matrix 14 may be illuminated at one time to indicate the relative positions of the several objects detected. Of course, as will be appreciated by those skilled in the radar and directional equipment art, the pulse repetition rate is selected as a matter of conventional design so that the time between pulses is sufficient to enable complete processing of a received pulse corresponding to a particular propagated pulse before pulses corresponding to any subsequent propagated pulse are received and processed.

An observer in the aircraft in which the display matrix 14 is being view can watch the approach and progress of all objects that come within the range of the detection system, regardless of fog, blind spots or the like. In this connection, objects on collision courses with the aircraft are clearly manifested by the display system, and avoidance maneuvering can be done directly by the pilot. Hence, heavy, complex, and relatively expensive computers and associated control circuitry are eliminated.

It will be apparent from the foregoing that, while particular forms of my invention have been illustrated and described, various modifications can be made without departing from the spirit and scope of my invention. Accordingly, I do not intend that my invention be limited, except as by the appended claims.

I claim:

1. In a proximity warning system, the combination comprising: a directional array including a plurality of stationary line electrical conductors radiating outwardly in different directions from a common reference center, each of said direction line conductors being electrically insulated from every other direction line conductor; a stationary distance array superimposed upon said directional array and electrically insulated therefrom, said distance array including a plurality of distance line electrical conductors, each of said distance line conductors being electrically insulated from every other distance line conductor, each distance line conductor being closely adjacent a portion of every direction line conductor at a common radial distance from said reference center of all of said direction line conductors, said common radial distance being a different distance for each distance line conductor; means for selectively illuminating any crossover zone where a direction line conductor is closely adjacent a distance line conductor in response to simultaneous electrical energization of the direction line conductor and the distance line conductor at the particlular crossover zone; means for selectively energizing said direction line conductors in accordance with the direction of arrival of signals from an object whose position is to be displayed; and means for selectively energizing said distance lines in accordance with the time of arrival of said signals from said object.

2. A combination as set forth in claim 1, wherein said means for selectively illuminating any crossover zone includes a lamp electrically connected between the direction line conductor and the distance line conductor at each crossover zone.

3. A combination as set forth in claim 1, wherein said means for selectively illuminating any crossover zone includes a gas capable of localized glow discharge at a crossover zone upon the application of a breakdown voltage between the direction line conductor and the distance line conductor at the particular crossover zone.

4. A proximity display system, comprising: a stationary three-dimensional polar coordinate direction line and distance line matrix of electrical conductors, each of said conductors being electrically insulated from every other conductor; means for selectively illuminating any coordinate crossover zone in response to simultaneous electrical energization of the direction line and the distance line at the particular zone; electrical power supply means; a plurality of normally disabled direction gates, one for each of said direction lines, each of said direction gates being electrically connected between said power supply means and the direction line corresponding to that particular direction gate; means for selectively enabling one of said direction gates and electrically energizing the corresponding direction line in accordance with the direction of arrival of a reflected signal from an object whose position is to be displayed; a plurality of normally disabled distance gates, one for each distance line, each of said distance gates being electrically connected between said power supply means and the distance line corresponding to that particular distance gate; and means for selectively enabling one of said distance gates and electrically energizing the corresponding distance line in accordance with the time of arrival of said reflected signal from said object.

5. A proximity display system as set forth in claim 4, including a variable resistance in series with said electrical power supply means for varying the intensity of illumination at the coordinate crossover zones.

6. A proximity display system as set forth in claim 4, wherein said means for selectively illuminating any coordinate crossover zone includes a lamp electrically connected between the direction line conductor and the distance line conductor at each crossover zone.

7. A proximity display system as rest forth in claim 4, wherein said means for selectively illuminating any coordinate crossover zone includes a gas capable of localized glow discharge at a crossover zone upon the application of a breakdown voltage for said gas between the direction line conductor and the distance line conductor at the particular crossover zone.

8. In a proximity display system, the combination comprising: a transparent housing; a directional array within said housing, said directional array including a plurality of stationary direction line electrical conductors radiating outwardly in different directions from a common center, each of said direction line conductors being electrically insulated from every other direction line conductor; a distance array within said housing, said distance array being superimposed upon said directional array but electrically insulated therefrom, said distance array including a plurality of stationary distance line electrical conductors, each of said distance line conductors being electrically insulated from every other distance line conductor, each distance line conductor being closely adjacent a portion of every direction line conductor at a common radial distance from said common center of all of said direction line conductors, said common radial distance being a different distance for each distance line conductor; means for selectively illuminating any crossover zone where a direction line conductor is closely adjacent a distance line conductor in response to the simultaneous application of different levels of electrical potential to the direction line conductor and the distance line conductor at the particular crossover zone; means for transmitting pulses of electromagnetic energy to an object whose location is to be displayed by the system; receiving means for detecting reflected pulses from said object; electrical power supply means; a plurality of normally disabled direction gates, one for each direction line conductor, each direction gate being electrically connected between said power supply means and the direction line conductor corresponding to that particular direction gate; a plurality of normally disabled distance gates, one for each distance line conductor, each of said distance gates being electrically connected between said power supply means and the distance line conductor corresponding to that particular distance gate; means responsive to said receiving means for selectively enabling one of said direction gates and electrically energizing the corresponding direction line conductor in accordance with the direction of arrival of said reflected pulses from said object; timing means; and means responsive to said receiving means and said timing means for selectively enabling one of said distance gates and electrically energizing the corresponding distance line conductor in accordance with the time of arrival of said reflected pulses from said object.

9. A combination as set forth in claim 8, wherein said means for selectively illuminating any crossover zone includes a neon bulb electrically connected between the direction line conductor and the distance line conductor at each crossover zone.

10. A combination as set forth in claim 8, wherein said housing is gastight and said means for selectively illuminating any crossover zone includes a gas within said housing, said gas being capable of localized glow discharge at a crossover zone upon the application of a breakdown voltage between the direction line conductor and the distance line conductor at the particular crossover zone.

References Cited by the Examiner

UNITED STATES PATENTS

| | | | |
|---|---|---|---|
| 2,749,480 | 6/1956 | Ruderfer | 178—6.5 X |
| 3,097,261 | 7/1963 | Schipper et al. | 343—7.9 X |
| 3,154,636 | 10/1964 | Schwertz | 343—7.9 X |
| 3,161,875 | 12/1964 | Preikschat | 343—7.9 |
| 3,177,486 | 4/1965 | Crooker | 343—7.9 |

RODNEY D. BENNETT, *Primary Examiner.*

CHESTER L. JUSTUS, *Examiner.*

P. M. HINDERSTEIN, D. C. KAUFMAN,
*Assistant Examiners.*